April 26, 1966 SABURO UEMURA 3,248,718

TIME DIVISION MULTIPLEX SYSTEM WITH SPECIAL APPLICATION TO MAGNETIC RECORDING

Filed July 17, 1961 8 Sheets-Sheet 1

Inventor
Saburo Uemura by Hill, Sherman, Meroni, Gross & Simpson

Attys.

Inventor
Saburo Uemura by Hill, Sherman, Meroni, Gross & Simpson
Attys.

Inventor
Saburo Uemura by Hill, Sherman, Meroni, Gross & Simpson Attys.

Inventor
Saburo Uemura by Hill, Sherman, Meroni, Gross & Simpson
Attys.

April 26, 1966 SABURO UEMURA 3,248,718

TIME DIVISION MULTIPLEX SYSTEM WITH SPECIAL APPLICATION TO MAGNETIC RECORDING

Filed July 17, 1961 8 Sheets-Sheet 5

Inventor
Saburo Uemura by Hill, Sherman, Meroni, Gross & Simpson Attys.

Inventor
Saburo Uemura
by Hill, Sherman, Meroni, Gross & Simpson
Attys.

Inventor
Saburo Uemura
by Hill, Sherman, Meroni, Gross & Simpson
Attys.

Inventor
Saburo Uemura
by Hill, Sherman, Meroni, Gross & Simpson
Attys.

3,248,718
Patented Apr. 26, 1966

3,248,718

TIME DIVISION MULTIPLEX SYSTEM WITH SPECIAL APPLICATION TO MAGNETIC RECORDING

Saburo Uemura, Tokyo, Japan, assignor to Sony Corporation, Tokyo, Japan, a corporation of Japan Filed July 17, 1961, Ser. No. 124,635
Claims priority, application Japan, July 21, 1960, 35/32,302
8 Claims. (Cl. 340—174.1)

This invention relates to a signal transmission system and more particularly to a magnetic recording and reproducing system for recording a plurality of signals on a single record channel in the form of a time division multiplex waveform and for reproducing such recorded waveform to obtain the original individual signals.

Various forms of time division multiplexing have been utilized for transmitting a number of signals over one communication channel. Generally in such systems, the waveform transmitted comprises a series of pulse groups occurring at regular time intervals but with the individual pulses in each group being time or amplitude modulated in accordance with the respective signals being transmitted by the waveform. It is required that one pulse in each successive pulse group occur at a regular time interval to serve as a synchronizing pulse. In the case of pulse phase modulation system, a rectangular pulse of greater duration than the other pulses in the waveform is employed as the synchronizing pulse. In demodulating the waveform, the synchronizing pulse is separated from the signal pulses on the basis of the greater width of the synchronizing pulse.

If it is attempted to apply such a phase modulation system to magnetic recording, the playback head will differentiate the rectangular synchronizing pulses and produce pulses at the leading and trailing edges of each rectangular synchronizing pulse which are generally of the same waveform as the signal pulses produced by the playback head, so that it is difficult to separate the synchronizing portion of the reproduced waveform from the signal portion.

It is therefore an object of the present invention to provide a magnetic recording and reproducing system in which a plurality of signals may be efficiently and economically recorded on and reproduced from a single channel of a magnetic record medium.

Another object of the present invention is to provide a magnetic recording and reproducing system which utilizes a time division multiplex waveform in which the synchronizing signal can be readily separated from the information signals during the repduction process.

A further object of the invention is to provide a magnetic recording and reproducing system which is relatively simple and yet which provides a faithful reproduction of the recorded signals.

A still further object of the invention is to provide a signal transmission system wherein a plurality of signals are synthesized into a novel multiplex pulse width modulated wavefom which may provide a conveniently separated synchronizing signal.

Other objects, features and advantages of the present invention will be apparent from the following description taken in connection with the accompanying drawings, in which.

Figure 8:
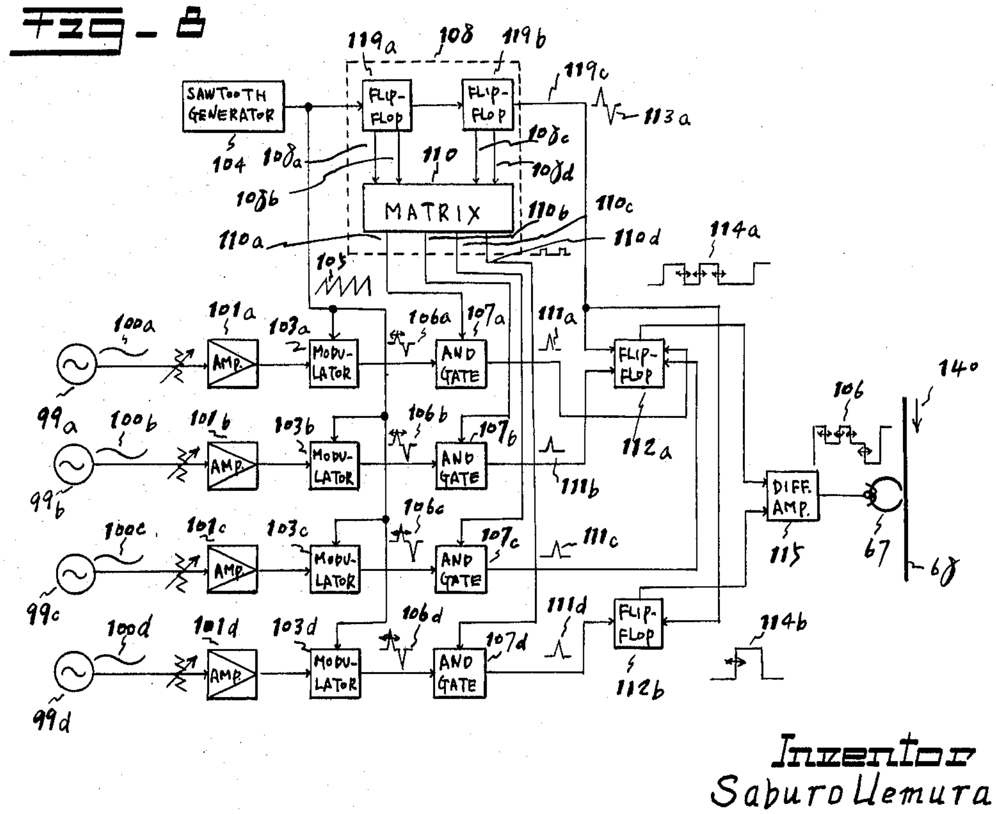
FIGURE 8 is a block diagram of a recording system wherein four individual signals are multiplexed and recorded on a single channel of a record medium by means of a time modulated multiplex waveform in accordance with the present invention.
Figure 10:
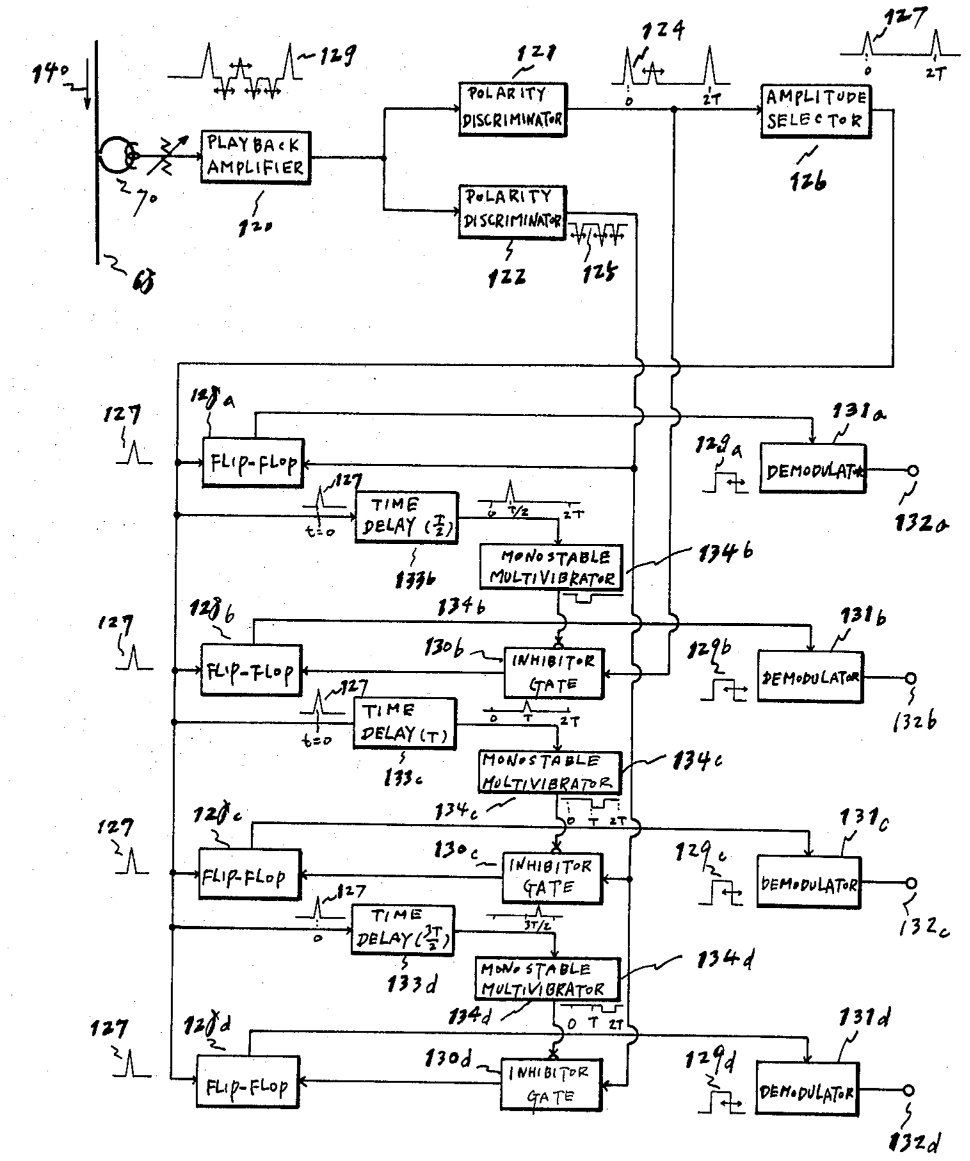
Figure 11:
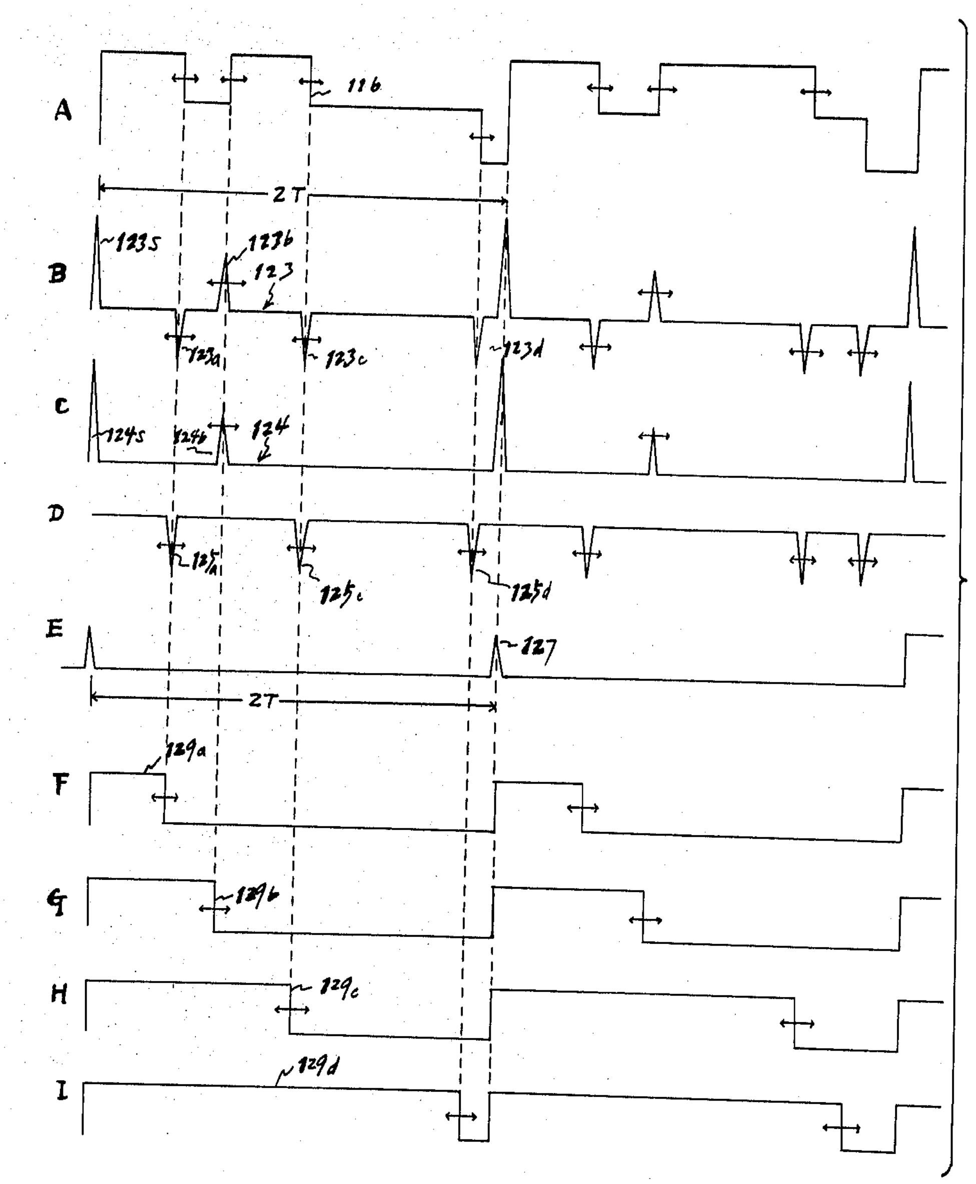

FIGURE 10 is a block diagram of a system for reproducing a signal recorded by the system of FIGURE 8 involving the multiplexing of four input signals; and FIGURE 11 shows a series of waveforms to be specifically designated as FIGURES 11A through 11I showing the successive steps carried out by the playback system of FIGURE 10 in converting the recorded multiplex signal into the component signals which were supplied to the recording system of FIGURE 8.

Figure 1:
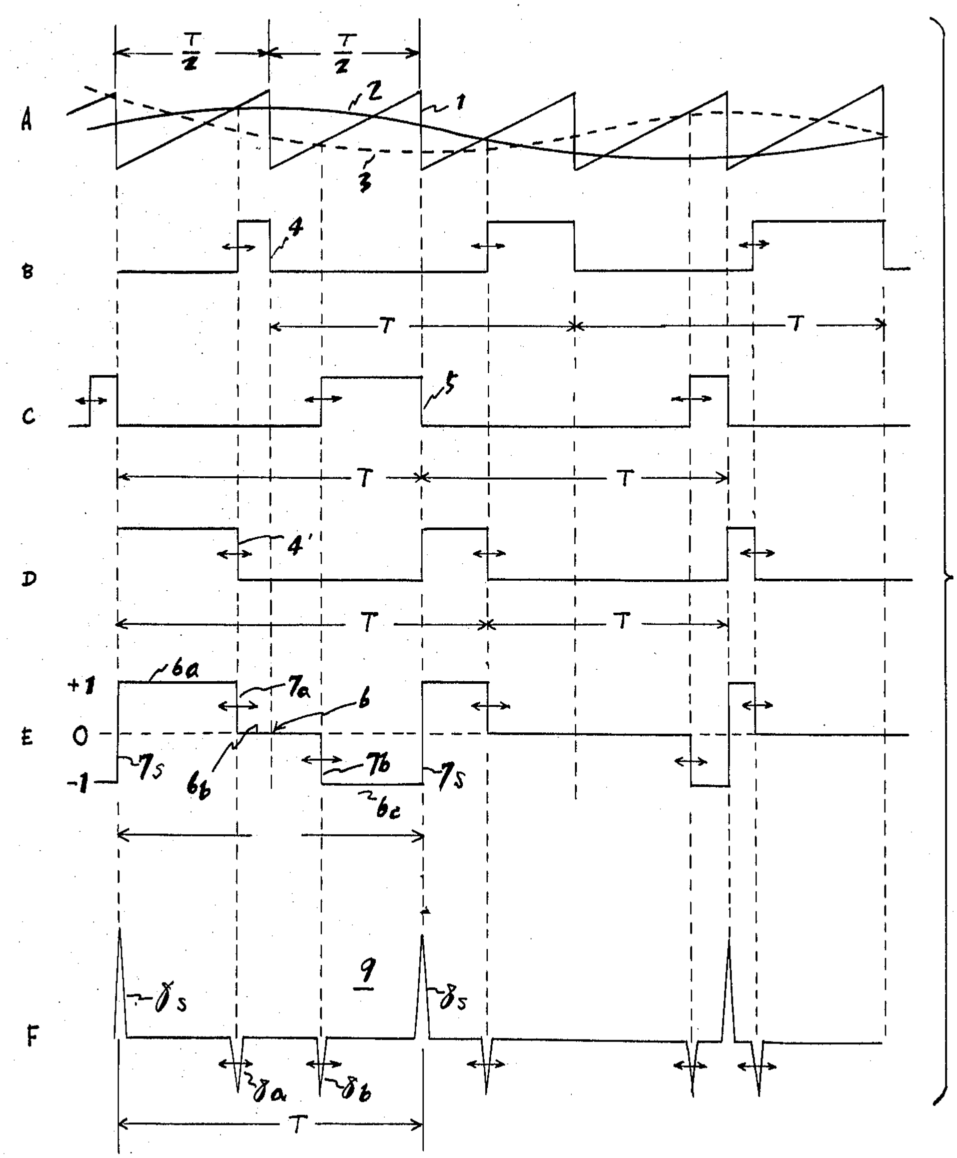
FIGURE 1 shows a series of waveforms which will be designated FIGURES 1A through 1F and which are on the same time scale and illustrate the successive steps in generating a time division multiplex waveform in accordance with the present invention for the case of two input signals to be recorded on a single channel of a record medium.
Figure 5:
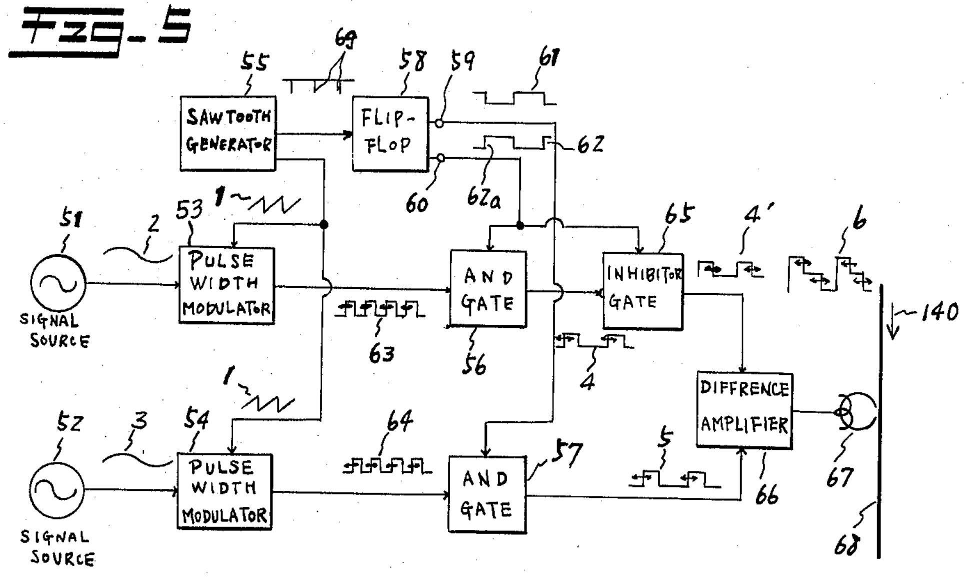
FIGURE 5 is a block diagram illustrating one embodiment of a time division multiplex magnetic recording system according to the present invention.

FIGURE 1 illustrates the principle of operation of the embodiment of FIGURE 5 which is utilized to record signal waveforms such as indicated at 2 and 3 in FIGURES 1 and 5 on a single channel of a magnetic record medium. The input waveforms 2 and 3 are converted to respective pulse width modulated signals 4 and 5 as illustrated in FIGURES 1B and 1C. By way of example, a sawtooth waveform 1 is illustrated as providing a time base with a repetition period of time $T/2$. A suitable amplitude comparison circuit compares the voltage amplitude of the sawtooth waveform and the signal to be modulated and generates a suitable pulse at the instant of time when the sawtooth waveform has a voltage equal to the instantaneous voltage of the signal. Any suitable means may be utilized for converting such a voltage coincidence pulse to a pulse width modulated waveform as indicated in FIGURES 1B and 1C, for example the coincidence pulse may set a bistable multivibrator circuit (flip-flop) and the trailing edge of the sawtooth waveform may be utilized to reset the flip-flop to generate the rectangular waveform of FIGURES 1B and 1C. It will be noted that the trailing edges of the successive pulses of waveforms 4 and 5 are spaced by a time period T and that the trailing edges of the pulses of waveform 5 are offset from the trailing edges of the pulses of waveform 4 by a time period $T/2$. In the drawings step portions of the pulse waveforms marked with double headed arrows indicate that the time position of such step portions is modulated in accordance with a signal. In FIGURES 1B and 1C, the leading edges of the pulses are modulated in accordance with input signal waveforms 2 and 3 of FIGURE 1A respectively.

As will hereinafter be explained in connection with FIGURE 5, the leading edge pulse width modulated waveform 4 is converted into a trailing edge pulse width modulated waveform as indicated at 4' in FIGURE 1D. By suitable combination of the waveforms of FIGURES 1C and 1D, that is by subtracting waveform 5 from waveform 4', a multiplex waveform as indicated at 6 in FIGURE 1E is obtained. The waveform 6 will be referred to as a multi-level or multi-value rectangular waveform in the present specification referring to the fact that there are more than two levels such as indicated at **6*a*, 6*b* and 6*c* in each cycle of the waveform. Thus, if a base level line is drawn through the waveform at level 6*b* and designated as a zero level, there are two additional levels to the waveform. The level 6*a* may be designated as the plus one level and the level 6*c* may be designated as the minus level as indicated in FIGURE 1E. A rising portion 7*s* of each cycle of the waveform 6 corresponds to the beginning point of the sawtooth waveform voltage 1 and these amplitude step portions 7*s* of the waveform of FIGURE 1E occur at a constant time spacing of T and provide the necessary synchronization during the reproduction process. The trailing portion or step portion of the waveform indicated at 7*a* in FIGURE 1E occurs at a variable time spacing relative to portion 7*s* in successive cycles of the waveform in accordance with signal waveform 2 of FIGURE 1A. The further step portion 7B in FIGURE 1E follows portion 7*s* in successive cycles with a time spacing which is a function of the waveform 3** of FIGURE 1A.

If a three-value pulse waveform as indicated at 6 in FIGURE 1E is magnetically recorded by means of a magnetic head on a magnetic record medium and is then reproduced by means of a conventional playback head, a waveform 9 is generated as indicated in FIGURE 1F. Referring to FIGURE 1F, the positive pulses **8*s* correspond in time to the rising step portions 7*s* of FIGURE 1E, and the negative pulses 8*a* and 8*b* correspond in time with step portions 7*a* and 7*b* in FIGURE 1E and have amplitudes which are equal to one-half the amplitude of the positive pulses 8*s*. The pulses 8*s* have a constant time separation T and thus may be utilized as the synchronizing signal during playback of the recorded signal. The pulses 8*a* and 8*b* are time modulated in accordance with the input signal waveforms 2 and 3 of FIGURE 1A and may be utilized to reproduce the input waveforms 2 and 3**.

FIGURE 1 represents the multiplexing of two input signals for recording on a single channel of a record medium, but generally a plurality of signals may be recorded in the form of a multi-value rectangular waveform of the general type indicated in FIGURE 1E. As a further example, FIGURE 2A illustrates a time modulated three level rectangular waveform for multiplex transmission of an even number of input signals, specifically six input signals. To produce this type of waveform, a sawtooth voltage wave such as indicated in FIGURE 1A is utilized in conjunction with a series of amplitude comparison circuits and the sawtooth waveform may have a repetition frequency of $T/6$ where six input signals are to be sampled within a time period T as indicated in FIGURE 2A. A system for selectively sampling an even number of input signals, namely four input signals, is illustrated in FIGURE 8 and this system may be readily expanded to include a larger number of signals as will be apparent to those skilled in the art. Thus, the waveform 10 of FIGURE 2A has successive time modulated portions **11*a*, 11*b*, 11*c*, 11*d*, 11*e* and 11*f* which are modulated in accordance with the respective input signals. The portions 11*s*** of the waveform recur at time intervals T and thus serve as synchronizing signals as in the waveform of FIGURE 1E.

Figure 2:
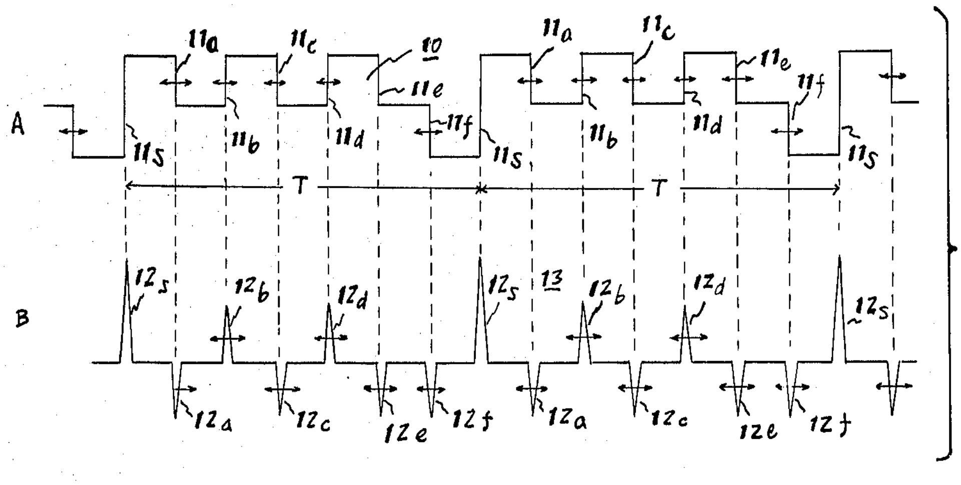
FIGURE 2 illustrates in the portion thereof to be designated FIGURE 2A a waveform in accordance with the present invention which multiplexes a group of six individual signals for recording on a single channel of a record medium and illustrates in the portion to be designated FIGURE 2B the reproduced waveform corresponding to a recorded signal as indicated in FIGURE 2A.

FIGURE 2B illustrates the output from a magnetic playback head scanning a recorded waveform as indicated in FIGURE 2A. The time modulated pulses **12*a*, 12*b*, 12*c*, 12*d* and 12*e* are of alternate polarity while signal pulse 12*f* is of the same polarity as pulse 12*e*. The synchronizing pulses 12*s* of the differentiated waveform 13** of FIGURE 2B have twice the amplitude of the signal pulses and thus may readily be separated from the time modulated pulses to synchronize the playback system. A recording and playback system embodying the principles of FIGURE 2 is illustrated in FIGURES 8, 9, 10 and 11, and will be described hereinafter in detail.

Figure 3:
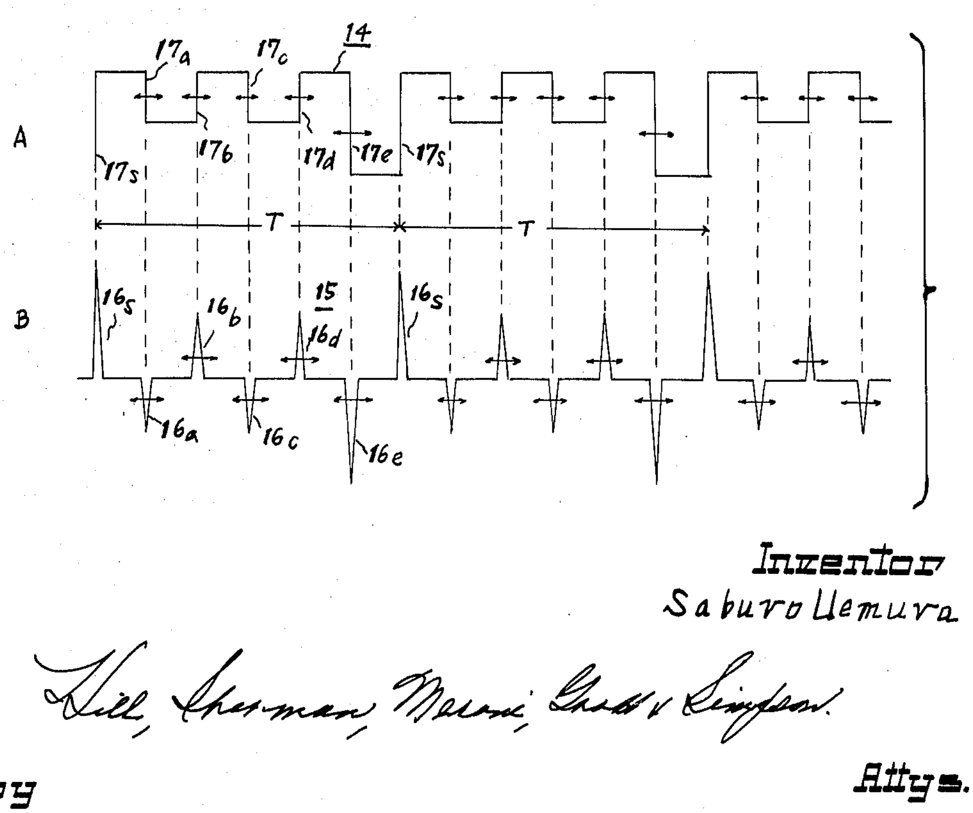
FIGURE 3 is similar to FIGURE 2 but illustrates the waveforms where an odd number of signals, specifically five individual signals, are to be multiplexed for recording on and reproduction from a single channel of a record medium.

FIGURE 3A illustrates a time modulated multiplex waveform having three levels for multiplexing an odd number of signals, specifically five input signals. Where the time spacing between successive synchronizing portions **17*s* of the waveform 14 is equal to T, the waveform may be synthesized by voltage comparison of the respective signals with respective sawtooth waveforms having a repetition frequency of $T/5$. The time modulated portions of the waveform 14 corresponding to the respective input signals are indicated at 17*a*, 17*b*, 17*c*, 17*d* and 17*e*. When this waveform is recorded on a record medium and reproduced by a conventional playback head, the waveform is effectively differentiated to produce an output waveform as indicated at 15 in FIGURE 3B including synchronizing pulses 16*s* and time modulated signal pulses 16*a*, 16*b*, 16*c*, 16*d* and 16*e*. It will be noted that while the amplitude of one of the signal pulses, for example 16*e*, is the same as the amplitude of the synchronizing pulses 16*s***, the signal pulse of such amplitude may be of opposite polarity from the synchronizing pulses so that the synchronizing pulses may be easily separated and utilized to synchronize the playback process.

Figure 4:
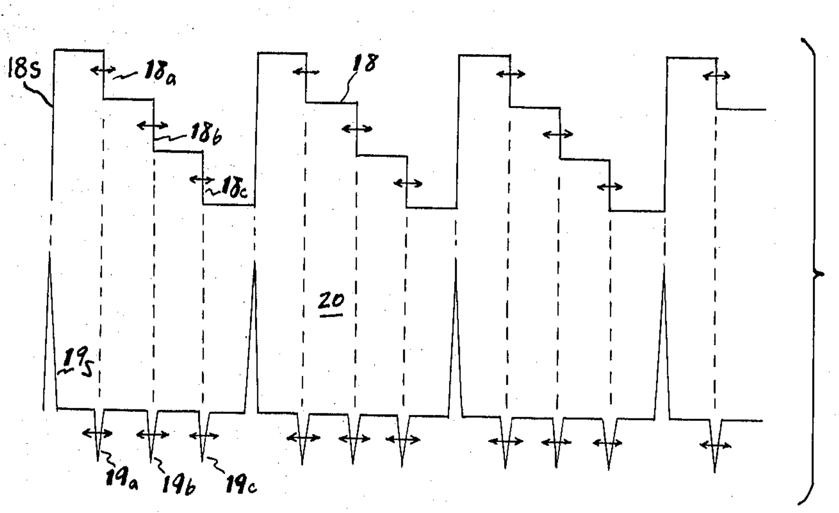
FIGURE 4 is a view similar to FIGURES 2 and 3 bul illustrates a different form of multiplex signal wherein the synchronizing pulses reproduced from the playback head have an amplitude three times greater than the signal pulses, and the signal pulses are all of opposite polarity from the synchronzing pulses.

As illustrated in FIGURE 4A, a multiplex system according to the present invention may utilize a rectangular waveform having more than three levels and may produce synchronizing pulses of one polarity and signal pulses of opposite polarity and of uniformly lesser amplitude in the playback process. Thus, given a recorded waveform as indicated in FIGURE 4A having synchronizing portions portions **18*s* and time modulated portions 18*a*, 18*b* and 18*c* varying in accordance with respective input signals, an output waveform from a conventional playback system would be as indicated at 20 in FIGURE 4B and comprises synchronizing pulses 19*s* of one polarity and signal pulses 19*a*, 19*b* and 19*c*** of opposite polarity and of approximately one-third the amplitude of the synchronizing pulses.

Having indicated the general nature and scope of the concepts of the present invention, two typical embodiments will now be explained in detail.

FIGURE 5 illustrates a recording system employing the concepts of FIGURE 1 and corresponding reference numbers have been applied to the corresponding waveforms in the two figures. In FIGURE 5, signal sources 51 and 52 are indicated as supplying signal waveforms 2 and 3 of FIGURE 1A to pulse width modulator circuits 53 and 54. A sawtooth waveform generator is indicated at 55 for supplying a sawtooth waveform as indicated at 1 in FIGURE 1A to the pulse width modulator circuits 53 and 54. The pulse width modulator circuits 53 and 54 may operate on the principle of voltage amplitude comparison of the respective input signals with the reference sawtooth signal and generate a trigger pulse at the successive instants of time when the sawtooth waveform rises to a value equal to the instantaneous value of the input waveform 2 or 3. A circuit for generating a time modulated pulse waveform of this type is indicated in the Radiation Laboratory Series, volume 19, "Waveforms," FIGURE 13–4, page 478. Such a time modulated pulse waveform may readily be converted to a pulse width modulated waveform such as indicated at 63 or 64 in FIGURE 5 by utilizing the time modulated pulses to set a bistable multivibrator circuit which is then reset by the trailing edge of the sawtooth waveform 1. A suitable differentiating circuit may be interposed between sawtooth generator 55 and the bistable circuit to generate negative pulses such as indicated at 69 in FIGURE 5 for resetting the bistable circuit. Of course, any suitable means may be utilized for generating the pulse width modulated waveforms 63 and 64 which are time modulated in accordance with the input waveforms 2 and 3.

In order to generate the waveforms indicated at 4 and 5 in FIGURES 1B and 1C from the waveforms 63 and 64 of FIGURE 5, coincident or "AND" gate circuits 56 and 57 are utilized in conjunction with a bistable multivibrator or flip-flop circuit 58. The flip-flop circuit 58 is successively triggered by a series of pulses 69 having a time spacing of $T/2$. The pulses 69 may be formed by differentiation of the trailing edges of the sawtooth waveform 1 as previously described and may be effective to successively set and reset the flip-flop circuit 58 to generate the waveform 61 at terminal 59 and the waveform 62 at terminal 60. Thus during one time period of $T/2$ of the waveform 63, terminal 60 will be at a high voltage condition to transmit a pulse of waveform 63, while in the next time period $T/2$, terminal 60 will be in a low voltage condition and the next pulse of waveform 63 will be blocked. The output from the gate circuit 56 will thus be the waveform 4 of FIGURE 1B. Each time that the gate circuit 56 is blocked due to a low voltage signal from terminal 60, terminal 59 of flip-flop 58 will be at a high voltage condition and a pulse of waveform 64 will be transmitted by gate 57. The output of gate circuit 57 will thus correspond to the waveform 5 of FIGURE 1C and will be out of phase with respect to the waveform of FIGURE 1B as indicated in FIGURE 1.

To convert the waveform of FIGURE 1B to the waveform of FIGURE 1D, terminal 60 of the flip-flop 58 is also coupled to one input of an inhibitor gate circuit 65 so that the rising step portion 62*a* of waveform 62 appears at the output of the inhibitor gate 65 until inhibited by the rising step portion of waveform 4 from gate circuit 56. Thus, inhibitor gate circuit 65 produces an output waveform 4' as indicated in FIGURE 1D wherein the trailing edge of the successive pulses of the waveform is time modulated in accordance with the input waveform 2. A difference amplifier 66 subtracts waveform 5 from waveform 4' to produce the multi-level rectangular waveform of FIGURE 1E and designated generally by the reference numeral 6. As previously described, this multiplex waveform comprises synchronizing portions 7*s* separated by a constant time period of T and time modulated signal portions 7*a* and 7*b* which are functions respectively of the input waveforms 2 and 3.

Figure 6:
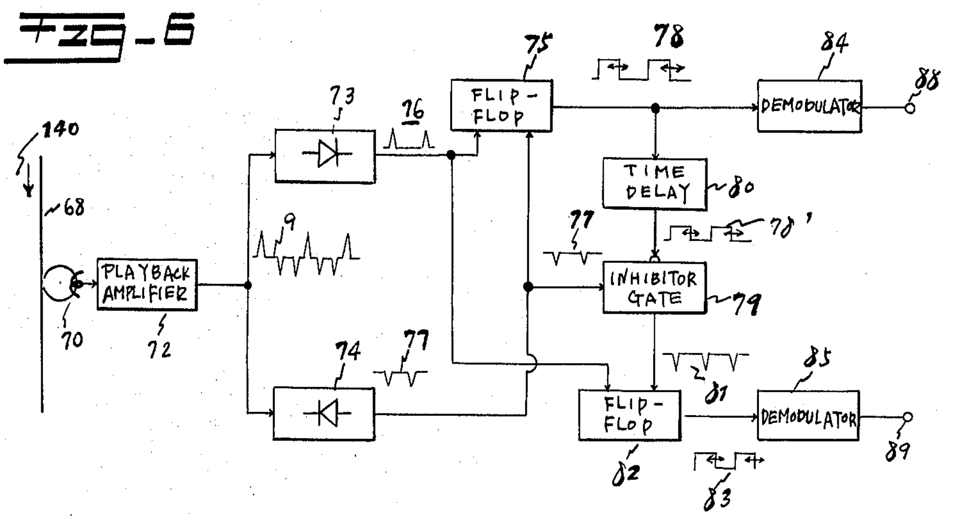
FIGURE 6 is a block diagram of the reproducing system for reproducing a signal recorded on the record medium by the system of FIGURE 5.
Figure 7:
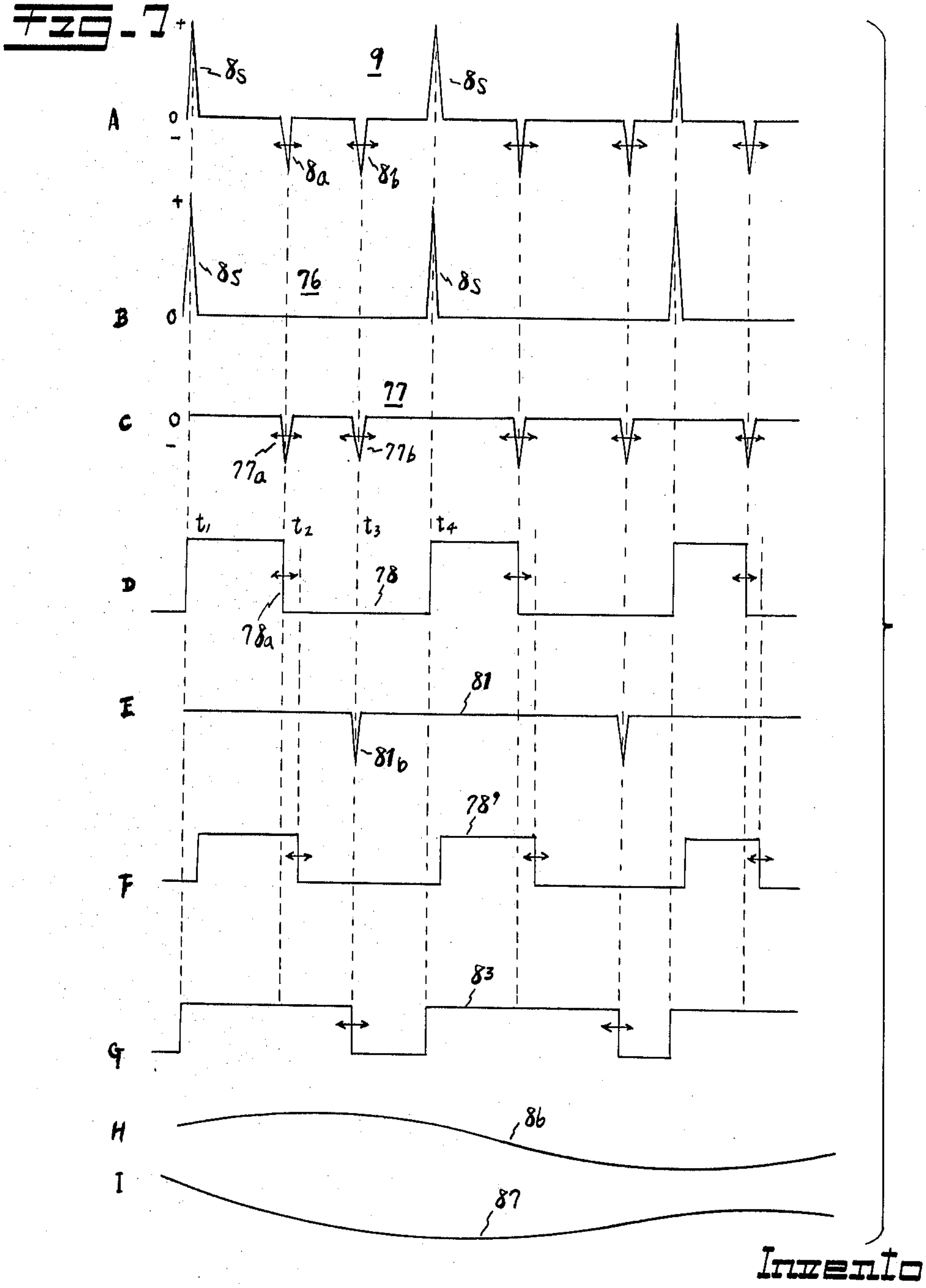
FIGURE 7 shows a series of waveforms which will be specifically designated as FIGURES 7A through 7I and which are on the same time scale and illustrate the manner in which the reproduced signal from the playback head in the system of FIGURE 6 is translated into the two individual signals originally supplied to the recording system of FIGURE 5.

FIGURES 6 and 7 illustrate a system for reproducing the signal recorded by the system of FIGURE 5. The record medium 68 having the recorded signal is moved at constant speed in the direction of arrow 140 past a conventional playback head 70 to produce an output from the head which is a function of the time rate of change of flux from the record medium linking the winding of the head. The signal induced in the head 70 is amplified by means of a suitable playback amplifier 72 to provide a waveform such as indicated at 9 in FIGURE 1F and FIGURE 7A. As previously explained, the synchronizing pulses 8*s* of the waveform 9 have approximately twice the amplitude of the signal pulses 8*a* and 8*b* and are of opposite polarity. A polarity discriminator which may comprise a suitable diode is arranged to transmit the synchronizing pulses 8*s* while blocking the signal pulses 8*a* and 8*b*. A polarity discriminator 74 is connected in the opposite sense from the discriminator 73 so as to pass the signal pulses 8*a* and 8*b* and block the synchronizing pulses 8*s*. The output of the discriminator 73 is thus a waveform such as indicated at 76 comprising a series of pulses having a time spacing therebetween equal to T. The synchronizing pulses of waveform 76 serve to set a flip-flop circuit 75 which is then reset by the first signal pulse 77*a*, FIGURE 7C of the waveform 77 transmitted by the polarity discriminator 74. The resultant waveform is illustrated in FIGURE 7D wherein the portion 78*a* is time modulated in accordance with the modulation of pulse 8*a* of waveform 9 of FIGURE 7A. It will be noted that the waveform 78 conforms to the waveform 4' of FIGURE 1D and may be demodulated in any suitable manner to produce the waveform 86 of FIGURE 7H corresponding input waveform 2 of FIGURE 1A. A pulse width demodulator circuit is indicated at 84 for delivering the desired waveform at terminal 88 corresponding to the input waveform 2. Various methods of time demodulation are described in Section 3–12 of volume 19 of the Radiation Laboratory Series "Waveforms" pages 55–57. By way of example, a duration-modulated wave as indicated in FIGURE 7D may be demodulated by average detecting the area of the wave. The resulting waveform is indicated at 86 in FIGURE 7H.

For obtaining the waveform corresponding to input waveform 3 in FIGURE 1A, waveform 77 of phase discriminator 74 is also coupled to an inhibitor gate circuit 79 which is only opened after the occurrence of the first signal pulse 11*a* of the waveform of FIGURE 7C. A flip-flop circuit 82 is set by the synchronizing pulses of waveform 76. The inhibitor gate circuit 79 controls reset of flip-flop circuit 82 and has its inhibiting input coupled to the output of flip-flop circuit 75 through a time delay circuit 80. Thus, a waveform 78' as indicated in FIGURE 7F is supplied to the inhibitor input of inhibitor gate 79 to allow reset of circuit 82 only after a time delay interval which is subsequent to the occurrence of signal pulse 77*a*. Thus, the waveform 78' maintain gate 79 in a blocking condition at the time of the first signal pulse 77*a*, but switches the gate 79 to an open condition prior to the time when pulse 77*b* of waveform 77 is applied to the gate circuit. The gate circuit 79 at this time will pass a negative pulse 77*b* to produce a waveform as indicated at 81 in FIGURE 7E at the output of gate circuit 79. Pulse 81*b* of waveform 81 is effective to reset flip-flop circuit 82 to generate waveform 83 at the output of circuit 82. If the waveform 83 of FIGURE 7G is inverted, it will correspond to the waveform 5 of FIGURE 1C. The waveform 83 may be demodulated by means of a suitable demodulating circuit 85 which may have the same form as the demodulator 84 to provide an output waveform 87, FIGURE 7I. For example, the area under the waveform 83 will be a function of the input waveform 3 so that the waveform 87 which corresponds to the input waveform 3 may be obtained by means of a suitable average detection circuit.

Figure 9:
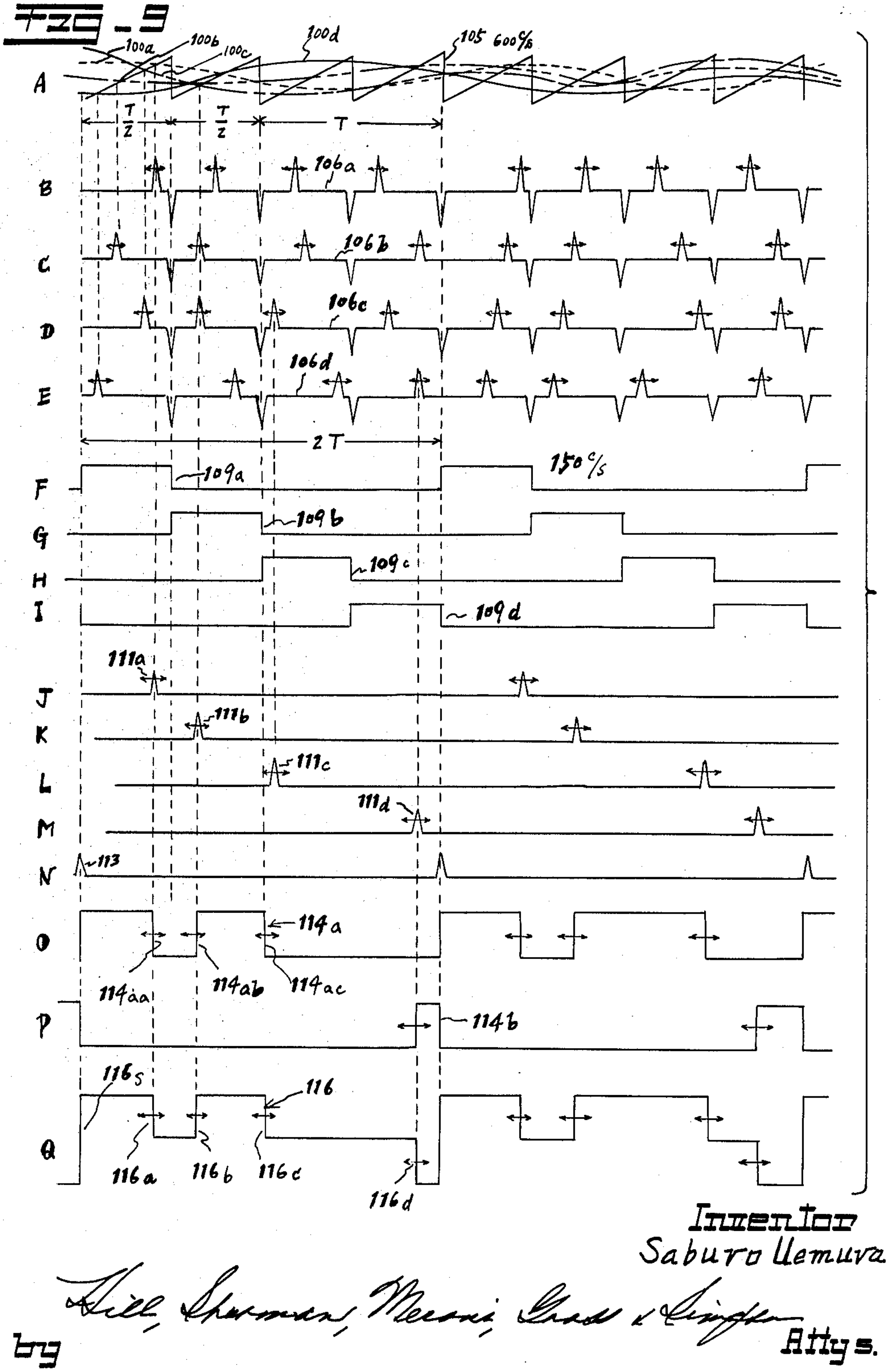
FIGURE 9 illustrates a series of waveforms which will be specifically designated as FIGURES 9A through 9Q and which represent the successive steps in converting the four input signals into a single multiplex time modulated waveform for recording on the record medium by the system of FIGURE 8.

FIGURES 8 and 9 illustrate a recording system for recording a series of four input signals on a single channel of a record medium, the four input signals being indicated at 100*a*, 100*b*, 100*c* and 100*d* in FIGURE 9A. The signal sources are diagrammatically indicated at 99*a*, 99*b*, 99*c* and 99*d*. The input signals are respectively amplified by means of amplifier components 101*a*, 101*b*, 101*c* and 101*d* and supplied to the inputs of respective time modulator circuits 103*a*, 103*b*, 103*c* and 103*d*. While any suitable circuit may be utilized for producing time modulated output signals such as represented in FIGURES 9B through 9E, a sawtooth generator 104 has been illustrated producing a sawtooth waveform 105 as indicated in FIGURE 9A. The time modulation circuits may then take the form illustrated in volume 19 of the Radiation Laboratory Series, "Waveforms" in FIGURE 13–4 at page 478, for example. As indicated in FIGURES 9A through 9E, the time modulated pulses of the output waveforms are determined by the instant of voltage equality between the respective input signals and the sawtooth waveform 105. The negative pulses of the waveforms 106*a* through 106*d* are separated by the time interval *T*/2 corresponding to the time interval between successive repetitions of the sawtooth waveform 105. A series of "AND" or coincident gates 107*a*, 107*b*, 107*c* and 107*d* are connected to the outputs of the respective modulator circuits and are utilized to select one of four successive pulses of each of the waveforms 106*a* through 106*d* as indicated in FIGURES 9J through 9M. This is accomplished by opening one of the gates 107*a* through 107*d* in each successive interval of time *T*/2. The reference numeral 108 designates generally a suitable gate signal generator for successively actuating gates 107*a* through 107*d* and has been indicated as comprising a pair of flip-flops 119*a* and 119*b* coupled to the gates under the control of a suitable matrix circuit 110 so as to generate the waveforms indicated in FIGURES 9F through 9I at the respective output lines 110*a* through 110*d* of the matrix. By way of example, the sawtooth generator 104 may supply a series of trigger pulses to the flip-flop 119*a* to successively set and reset this flip-flop and such trigger pulses may have a time period therebetwen of *T*/2 and may be generated in the same manner as the pulse output 69 from sawtooth generator 55 in FIGURE 5. By way of example, the matrix 110 may comprise a series of four "AND" gates, the gate associated with line 110*a* being controlled by the output lines 108*a* and 108*c* from flip-flop 119*a* and 119*b*, the gate associated with output line 110*b* being controlled by outputs 108*b* and 108*c* of the flip-flops, the line 110*c* being connected to a gate controlled by lines 108*a* and 108*d* of the flip-flops, and line 110*d* being under the control of a gate coupled to lines 108*b* and 108*d* from the series of flip-flops. Thus during the first time interval *T*/2, flip-flops 119*a* and 119*b* may be in set condition to apply relatively high voltages to lines 108*a* and 108*c* to open the gate in matrix 110 associated with line 110*a* and thus open gate 107*a*. At the end of the first time interval *T*/2, flip-flop 119*a* is reset while flip-flop 119*b* remains set and relatively high voltages are supplied to lines 108*b* and 108*c* to open the gate in matrix 110 associated with line 110*b* and open the corresponding gate 107*b*. In the third *T*/2 interval, flip-flop 119*a* is again set to reset flip-flop 119*b* so that high voltage conditions exist on lines 108*a* and 108*d* to open the gate in matrix 110 associated with line 110*c* and thus open gate 107*c*. In the fourth *T*/2 interval, flip-flop 119*a* is reset while flip-flop 119*b* remains reset and high voltage conditions exist on lines 108*b* and 108*d* to open the gate in matrix 110 associated with line 110*d* and thus open gate 107*d*.

The successive time modulated signals 11*a*–11*d* of FIGURES 9J–9M are supplied to flip-flop circuits 112*a* and 112*b* in conjunction with a synchronizing waveform as indicated at 113 in FIGURE 9N in such a manner as to generate the square wave outputs shown in parts O and P of FIGURE 9. The synchronizing waveform 113 may be obtained from the output of flip-flop 119*b* which is an alternating square wave which completes a cycle in a time period of 2T. By differentiating this alternating square wave, a series of pulses of alternate polarity as indicated at 113*a* in FIGURE 8 is obtained. Flip-flops 112*a* and 112*b* may be responsive only to positive polarity pulses, so that the output from flip-flop 119*b* after differentiation is effectively the waveform 113 indicated in FIGURE 9N, namely a series of pulses having a constant time spacing of 2T. For example, the output from flip-flop 119*b* connected to line 119*c* may be considered as including a suitable differentiating circuit to provide the waveform 113*a* at line 119*c*. Further, the input circuits of flip-flops 112*a* and 112*b* connected to line 119*c* may be considered as including a suitable rectifier so that the waveform 113 of FIGURE 9N is supplied to the flip-flop circuit of components 112*a* and 112*b*.

Thus, a first positive pulse of the waveform 113 in FIGURE 9N serves to set flip-flop circuit 112*a* as represented by waveform 114*a* at part O of FIGURE 9 and serves to reset flip-flop 112*b* to generate an output waveform as indicated at 114*b* in FIGURE 9P. Pulse 111*a* is delivered to a reset input of flip-flop 112*a* to reset flip-flop 112*a* as indicated in wavform 114*a*. Next, pulse 111*b* is delivered to a set input of flip-flop 112*a* to again set the flip-flop as indicated in waveform 114*a*. Pulse 111*c* is delivered to a reset input of flip-flop 112*a* to reset the flip-flop. The next cycle is initiated by the receipt of a further positive pulse of waveform 113. Thus a pulse width modulated waveform 114*a* is generated including portions 114*aa* which are time modulated in accordance with input signal 100*a*, portions 114*ab* time modulated in accordance with input signal 100*b* and portion 114*ac* time modulated in accordance with input signal 100*c*.

Flip-flop circuit 112*b* is reset by the first positive pulse of waveform 113 in FIGURE 9N and is then set by pulse 111*d* of FIGURE 9M to generate the waveform 114*b* including portion 114*ad* which is time modulated in accordance with input signal 100*d* of FIGURE 9A.

The outputs of flip-flop circuits 112*a* and 112*b* are then combined in a difference amplifier 115 to provide the difference waveform 116 or FIGURE 9Q including time modulated portions 116*a*, 116*b*, 116*c* and 116*d* modulated in accordance with respective input signals 100*a*, 100*b*, 100*c* and 100*d*, and including synchronizing portions 116*s* having a time spacing of 2T. The waveform 116 is then recorded on the record medium 68 by means of a conventional magnetic recording head 67 as in the embodiment of FIGURE 5.

It will be understood that the time modulated signals of FIGURES 9B through 9E are merely by way of example and the modulated signals may be of pulse width, pulse phase or pulse position modulation as desired. By way of example, where the frequency of the sawtooth voltage generator 104 is 600 cycles per second, the basic repetition rate of the waveform 116 will be 150 cycles per second corresponding to the multiplexing of four input signals 100*a* through 100*d*.

FIGURES 10 and 11 illustrate the system for reproducing the signal recorded by the system of FIGURE 8. Thus the playback head 70 of conventional design scans the record medium 68 having a recorded waveform as indicated at 116 in FIGURE 11A and produces an electrical output waveform as indicated at 123 in FIGURE 11B. It will be noted that the synchronizing pulses 123*s* have an amplitude approximately twice that of the signal pulses 123*a*, 123*b*, 123*c* and 123*d*. The waveform 123 is amplified by a suitable playback amplifier 120 and is delivered to the inputs of a pair of polarity discriminators 121 and 122 which may comprise suitable unidirectional conductive devices such as diodes arranged to pass opposite polarities of input signals. Thus, polarity discriminator 121 may transmit the positive pulses of waveform 123 as indicated by waveform 124 in FIGURE 11C, while polarity discriminator 122 may transmit the negative portions of the waveform as indicated at 125 in FIGURE 11D. Pulses 124*s* are at constant time spacing and constitute the synchronizing pulses, while pulse 124*b* is time modulated in accordance with input signal 100*b* of FIGURE 9A. Pulses 125*a*, 125*c* and 125*d* in FIGURE 11D are time modulated in accordance with input signals 100*a*, 100*c* and 100*d* in FIGURE 9A.

An amplitude selector circuit 126 may be arranged to transmit portions of waveform 124 having an amplitude above a predetermined level which is above the peak amplitude of signal pulses 124*b*. Circuit 126 may thus be termed a base clipping circuit. The output of circuit 126 is a series of pulses as indicated at 127 in FIGURE 11E having a time spacing of 2T so as to serve as synchronizing pulses for the playback system. Flip-flop circuits 128*a*–128*d* are all set by the initial pulse of waveform 127 of FIGURE 11E. Flip-flop 128*a* is reset by pulse 125*a* of waveform 125 to generate the output waveform 129*a* of FIGURE 11F.

The function of inhibitor gates 130*b*, 130*c* and 130*d* is to insure passage of pulses 124*b*, 125*c* and 125*d*, respectively, while blocking undesired pulses which might reset flip-flops 128*b*, 128*c* and 128*d* prior to the correct instant of time. Thus inhibitor gate 130*b* is to block synchronizing pulses 124*s*, inhibitor gate 130*c* is to block signal pulse 125*a* and inhibitor gate 130*d* is to block signal pulses 125*a* and 125*c*. While many circuits will be apparent for closing gates 130*b*, 130*c* and 130*d* except at the desired times, by way of illustration, respective time delay circuits 133*b*, 133*c* and 133*d* and respective monostable multivibrator circuits 134*b*, 134*c* and 134*d* have been illustrated. The time delay circuits 133*b*–133*d* have respective time delays of $T/2$, T and 1½ T, so that where the occurrence of a pulse 127 is taken at time $t=0$, time delay 133*b* triggers monostable multivibrator 134*b* at time $t=T/2$, time delay 133*c* triggers monostable 134*c* at time $t=T$, and time delay 133*d* triggers monostable multivibrator 134*d* at time $t=1\frac{1}{2}T$. The respective monostable multivibrators may generate negative pulses of width equal to $T/2$ to open the respective gates 130*b*, 130*c* and 130*d* at the desired times to pass pulses 125*b*, 125*c* and 125*d*, respectively. The output of monostable multivibrator 134*b* is such as to maintain inhibitor gate 130*b* in a blocking condition except between times such as $t=T/2$ to $t=T$. Similarly the output of monostable multivibrator 134*c* maintains gate 130*c* in blocking condition except between times such as $t=T$ to $t=1\frac{1}{2}T$ in each cycle, and monostable circuit 134*d* maintains gate 130*d* in blocking condition except between times such as $t=1\frac{1}{2}T$ to $t=2T$ in each cycle.

With this mode of operation, the waveforms obtained from flip-flops 128*a*–128*d* are indicated at 129*a*–129*d* in FIGURES 11F–11I. These waveforms may be time demodulated by suitable demodulator circuits 131*a*–131*d* which may take a form as discussed in connection with FIGURE 6 so as to obtain a reproduction of the initial waveforms 100*a*–100*d*.

Accordingly in the illustrated embodiments, the time modulated signals are recorded as a multiplex waveform having three or more levels with a synchronizing amplitude step occurring at regular intervals which provides a higher amplitude synchronizing pulse when the original waveform is differentiated, for example as a result of a conventional magnetic playback operation. Because of the higher amplitude of the synchronizing pulses, they are readily separated in the reproducing system and form a reliable basis for demodulating the recorded waveform and obtaining the original input signals. As has been specifically mentioned in connection with FIGURE 4, the signal waveform to be recorded or transmitted may have more than three values, the important point being an abrupt shift of the waveform for a number of amplitude levels greater than the amplitude level shfit representing signal portions of the waveform. It will be apparent that by proper selection of the frequency of the modulating wave such as the sawtooth waveform specifically illustrated, any desired number of signals may be multiplexed and transmitted as a single time modulated multiplex waveform of the type contemplated by the present invention. While the present invention is particularly adapted and has unique application to magnetic recording and reproducing, it is recognized that the basic concept of a multilevel step waveform having a plural step shift for generating synchronizing pulses may be novel per se and be applicable to signal transmission systems generally.

It will be apparent that many modifications and variations may be effected without departing from the scope of the novel concepts of the present invention.

I claim as my invention:

1. A magnetic reproducing system comprising a magnetic reproducing head for coupling to a record medium having a multiplex waveform recorded thereon including a succession of amplitude steps whose times of occurrence are modulated in accordance with respective input signals and including synchronizing amplitude steps with constant time intervals therebetween serving as synchronizing signals, means for deriving said synchronizing amplitude steps from said modulated amplitude steps, the extent of amplitude change in the amplitude steps serving as synchronizing signals being substantially greater than the extent of amplitude change in the modulated amplitude steps which have the same direction of amplitude change as the synchronizing amplitude steps, said magnetic reproducing head producing an electrical output proportional to the time rate of change of said recorded waveform including a series of signal pulses modulated in accordance with the respective input signals and a series of synchronizing pulses of substantially greater amplitude than the signal pulses of the same polarity, and means for separating said synchronizing pulses from said signal pulses and for demodulating said signal pulses to provide output signals varying in accordance with the respective input signals represented by said recorded waveform.

2. A magnetic recording system comprising a plurality of signal input means for receiving respective input signals, pulse width modulators coupled to the respective signal input means for generating pulse width modulated waveforms varying in accordance with the respective input signals, means coupled to said pulse width modulators for superimposing said pulse width modulated waveforms to combine successive amplitude steps of at least two of the waveforms which occur at constant time intervals to provide resultant synchronizing amplitude steps having an increased extent of amplitude change and to produce a multiplex waveform with successive signal modulated amplitude steps which are modulated in accordance with the respective input signals occurring between successive ones of said resultant synchronizing amplitude steps, and a recording head coupled to said superimposing means to record the multiplex waveform on a magnetic record medium.

3. A magnetic reproducing system comprising a magnetic reproducing head for coupling to a magnetic record medium having a multiplex waveform recorded thereon including in each cycle thereof a pair of abrupt amplitude steps whose respective times of occurrence in the successive cycles are modulated in accordance with respective input signals and including abrupt amplitude steps with constant time intervals therebetween serving as synchronizing signals, the amplitude steps serving as synchronizing signals having one direction of amplitude change as a function of time and the amplitude steps modulated in accordance with the respective input signals having the opposite direction of amplitude change as a function of time, said magnetic reproducing head producing an output waveform including synchronizing pulses of one polarity and time modulated signal pulses of opposite polarity, a pair of polarity discriminating circuits connected in parallel to the output side of said magnetic reproducing head, one being of polarity to transmit said synchronizing pulses and the other being of polarity to transmit said signal pulses, a bistable circuit coupled to the outputs of the polarity discriminating circuits for shifting to one stable condition upon receipt of each successive synchronizing pulse and for shifting to the other stable condition upon receipt of the next occurring signal pulse to generate a pulse width modulated signal, a second bistable circuit coupled to the polarity discriminating means delivering the synchronizing pulses and shiftable to one stable condition upon receipt of each of the synchronizing pulses, and means coupled to the output of the polarity discriminating means delivering the signal pulses and to the second bistable circuit and operative to block the first signal pulse occurring after each successive synchronizing pulse while transmitting the second signal pulse after each synchronizing pulse to generate a pulse width modulated signal at the output of the second bistable circuit modulated in accordance with the second signal recorded on the record medium, and means coupled to each of the bistable circuits for demodulating the pulse width output signal therefrom to provide an output signal varying with one of the signals recorded on the record medium.

4. A magnetic reproducing system comprising a magnetic record medium having a multiplex waveform recorded thereon including in each cycle thereof a pair of abrupt amplitude steps whose respective times of occurrence in the successive cycles of the waveform are modulated in accordance with respective input signals and including abrupt amplitude steps with constant time intervals therebetween serving as synchronizing signals, the direction of amplitude change of the synchronizing steps being opposite to the direction of amplitude change of the signal steps, a magnetic reproducing head coupled to the record medium for producing an electrical output proportional to the time rate of change of the recorded waveform including a series of signal pulses of one polarity and a series of synchronizing pulses of opposite polarity, a first bistable circuit for generating a pulse width modulated output signal and coupled to said magnetic reproducing head for shifting to one stable condition upon receipt of each successive synchronizing pulse and for shifting to the second stable condition upon receipt of a first signal pulse first occurring after each synchronizing pulse, a second bistable circuit for generating a pulse width modulated output waveform in accordance with a second signal recorded on the record medium and responsive to each synchronizing pulse to shift to one of its stable conditions, and means for delivering a second signal pulse following each synchronizing pulse produced by the head to the second bistable circuit for shifting the bistable circuit to its second stable condition, said last mentioned means comprising an inhibitor gate circuit coupled to the output of said head and to an input to said second bistable circuit for blocking said first signal pulse while transmitting said second signal pulse to said bistable circuit to shift the bistable circuit to its second stable condition, and means for maintaining said gate circuit in its blocking condition at the time of occurrence of the first signal pulse from the head comprising time delay means coupled to said gate circuit and to said first bistable circuit for maintaining said gate circuit in blocking condition from a time shortly after the occurrence of each synchronizing pulse to a time shortly after the occurrence of the next following first signal pulse, and demodulator means coupled respectively to the outputs of said first and second bistable circuits for providing first and second output signals varying in accordance with the respective signals recorded on the record medium.

5. A magnetic recording system for recording a plurality of signals comprising a plurality of signal input means for receiving the respective input signals, modulation means coupled to the respective input means for producing pulse width modulated signals modulated in accordance with the respective input signals, at least one of said pulse width modulated signals having a succession of steps in each cycle thereof time modulated in accordance with respective ones of a plurality of said input signals, means for superimposing said pulse width modulated signals to combine successive steps of at least two of the pulse width modulated signals which occur at constant time intervals to provide a resultant waveform having synchronizing amplitude step portions of substantially greater extent than the amplitude step portions of said pulse width modulated signals and the resultant waveform having signal modulated amplitude step portions time modulated in accordance with the respective input signals, and a recording head coupled to said superimposing means to record the resultant waveform on a magnetic record medium.

6. A magnetic reproducing system comprising a magnetic reproducing head for coupling to a magnetic record medium having a multiplex waveform recorded thereon including a plurality of modulated amplitude step portions in each cycle whose respective times of occurrence in the successive cycles are modulated in accordance with respective input signals and having synchronizing amplitude step portions with constant time intervals therebetween serving as synchronizing signals, the extent of the amplitude step portions serving as synchronizing signals being substantially greater than the extent of the modulated amplitude step portions which have the same direction of amplitude change as the synchronizing step portions, said head providing an electrical output proportional to the time rate of change of the recorded waveform including a series of signal pulses time modulated in accordance with the respective input signals and a series of synchronizing pulses of substantially greater amplitude than the signal pulses of the same polarity, means for segregating said synchronizing pulses from said signal pulses, a plurality of bistable means coupled to said segregating means for shifting to one stable condition at the time of occurrence of each synchronizing pulse, means for coupling the successive signal pulses successively occurring after the time of each synchronizing pulse to a respective different one of said bistable circuits to produce pulse width modulated signals at the outputs of the respective bistable circuits in accordance with the respective signals recorded on the record medium, and means for demodulating the respective pulse width modulated signals to provide individual signals varying in accordance with the signals recorded on the record medium.

7. In a signal transmission system, means for producing a plurality of pulse width modulated signals modulated in accordance with a plurality of input signals, means for superposing said pulse width modulated signals to provide a multiplex waveform including in each cycle thereof a succession of amplitude steps whose respective times of occurrence in the successive cycles of the waveform are modulated in accordance with the respective input signals and having synchronizing amplitude steps with constant time intervals therebetween, the extent of the synchronizing amplitude steps being substantially greater than the extent of the amplitude steps of the original pulse width modulated signals, means responsive to the time rate of change of the multiplex waveform to generate a series of signal pulses at the times of occurrence of the signal amplitude steps and to generate a series of synchronizing pulses at the times of occurrence of the synchronizing amplitude steps, the synchronizing pulses having substantially greater amplitudes than the signal pulses of the same polarity, means for segregating the synchronizing pulses from the signal pulses, and means coupled to said segregating means and to said time rate of change responsive means for generating individual signal waveforms varying in accordance with the respective input signals.

8. The signal transmission system of claim 7 wherein said multiplex waveform from said superposing means is recorded on a record medium and said responsive means comprises means for reproducing the recorded signal from said record medium.

(References on following page)

References Cited by the Examiner

UNITED STATES PATENTS

| | | | |
|---|---|---|---|
| 2,527,638 | 10/1950 | Kreer et al. | 179—15 |
| 2,807,004 | 9/1957 | Pouliart et al. | 340—174.1 |
| 2,902,657 | 9/1959 | McCarter | 332—9 |
| 2,917,726 | 12/1959 | Golden et al. | 340—174.1 |
| 2,920,288 | 1/1960 | Lair | 332—9 |

IRVING L. SRAGOW, *Primary Examiner.*

R. M. JENNINGS, A. L. NEUSTADT, *Assistant Examiners.*